United States Patent
Wang et al.

(10) Patent No.: US 7,534,846 B2
(45) Date of Patent: May 19, 2009

(54) ONIUM-MODIFIED POLYMER AND METHOD FOR MANUFACTURING SAME

(75) Inventors: Xiaorong Wang, Hudson, OH (US); Victor J. Foltz, Akron, OH (US); David F. Lawson, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 376 days.

(21) Appl. No.: 11/126,657

(22) Filed: May 11, 2005

(65) Prior Publication Data
US 2006/0047054 A1    Mar. 2, 2006

(51) Int. Cl.
*C08F 26/06*    (2006.01)

(52) U.S. Cl. .................. 526/258; 526/348; 525/79; 525/118

(58) Field of Classification Search .......... 526/258, 526/348; 525/79, 118, 121; 425/28.1; 156/112
See application file for complete search history.

(56) References Cited

U.S. PATENT DOCUMENTS

| | | | | |
|---|---|---|---|---|
| 2,891,025 A | * | 6/1959 | Price .......................... | 524/420 |
| 4,412,011 A | * | 10/1983 | Kihara et al. ................. | 521/38 |
| 4,450,224 A | * | 5/1984 | Klein et al. ................. | 430/213 |
| 4,594,308 A | * | 6/1986 | Nakamura et al. ........... | 430/213 |
| 4,619,883 A | * | 10/1986 | Aono et al. ................. | 430/203 |
| 4,636,455 A | * | 1/1987 | Aono et al. ................. | 430/203 |
| 5,288,745 A | * | 2/1994 | Texter et al. ................ | 430/237 |
| 5,973,025 A | * | 10/1999 | Nigam et al. ............... | 523/160 |

OTHER PUBLICATIONS

J. S. Wilkes, J. A. Levisky, B. A. Wilson, Inorg. Chem. 1982, 21, 1263-1264.
C. Tiyapiboonchaiya, D. R. MacFarlane, J. Sun, M. Forsyth, Macromol. Chem. Phys., 2002, 203, 1906-1911.
M. Jensen, J. A. Dzielawa, P. Rickert, M. L. Dietz, Jacs, 2002, 124, 10664-10665.
C. Hardacre, J. D. Holbrey, S. E. J. McMath, D. T. Bowron, A. K. Soper, J. Chem. Phys. 2003, 118(1), 273-278.
H. Ma, X. Wan, X. Chen, Q-F. Zhou, J. Polym. Sci. A. Polym. Chem. 2003, 41, 143-151.
W. Dieterich, P. Maass, Chem. Phys., 2002, 284, 439-467.

* cited by examiner

*Primary Examiner*—Ling-Siu Choi
(74) *Attorney, Agent, or Firm*—Nathan T. Lewis; Neredith E. Hooker

(57) ABSTRACT

Onium-modified polymers, such as polyethers and alkylimidazolium-modified polymers are provided. The polymers have desirable properties such as moisture absorbing capability, low volatile organic compounds (VOCs) emission, and enhanced electrical conductivity. A method to prepare the polymers is also provided, in which green solvents such as ionic liquids are utilized as both reaction media and reactants.

9 Claims, 1 Drawing Sheet

ONIUM-MODIFIED POLYMER AND METHOD FOR MANUFACTURING SAME

BACKGROUND OF THE INVENTION

The present invention relates to onium-modified polymers. Particularly, the present invention relates to onium-modified polyethers and 1-alkylimidazolium-modified polymers. The polymers can exhibit moisture absorbance and enhanced electrical conductivity.

The 1990 amendment of the U.S. Clean Air Act has established a stringent standard on emission of VOCs and ozone-destroying chemicals for products used in industrial and household applications. VOCs include gasoline, industrial chemicals such as benzene, solvents such as toluene and xylene, and tetrachloroethylene or perchloroethylene, which is the principal dry cleaning solvent. Many of these VOCs are hazardous air pollutants, for example, benzene can cause cancer. Thus, it is desirable to reduce the amount of VOCs used in industrial processes and retained in the products therefrom.

Known to regularly include VOC's are conductive polymers, typically having an extended conjugated system for their backbone conductivity and/or containing dopants as additives to increase their conductivity or moisture absorption capacity, such as doped polyaniline, poly(ethylenedioxythiophene) (PEDOT), polyacetylene and polyacetylene derivatives, and moisture-absorbing materials. Because the preparations of most of these polymers often involve VOCs as solvents, naturally, certain amount of the VOCs residues will remain in the end products. Nonetheless, these polymers play important commercial roles. Conductive polymers have been used as cathodes and solid electrolytes in batteries, corrosion inhibiting coatings, battery membranes, and separators etc. Polymers with moisture-absorbing properties have been used as coatings for packaging material, and in the tire industry.

One advantage of the present invention is to provide novel onium-modified polymers that have good conductivity and strong moisture absorbing capability. Another advantage of the present invention is to use room temperature ionic liquids as both solvents and reactants, which are nonvolatile, non-flammable, and recyclable, to produce the onium-modified polymers.

SUMMARY OF THE INVENTION

According to one embodiment, the invention relates to a polymer having a polyether backbone and one or more onium cations linked thereto. According to one specific embodiment, the polymer is one of onium-modified polyethers or one of polymers having one or more pendant imidazolium derivatives.

According to a further embodiment, the polymers are prepared by reacting a halogen-containing polymer with an ionic liquid.

Still another aspect of the invention relates to a tire, a conductive composition, and a moisture-absorbing composition comprised of one of onium-modified polyethers or one of polymers having one or more pendant imidazolium derivatives.

BRIEF DESCRIPTION OF THE DRAWINGS

The invention may take form in various components and arrangements of components, and in various steps and arrangements of steps. The drawings, in which like reference numerals denote like components throughout the several views, are only for purposes of illustrating preferred embodiments and are not to be construed as limiting the invention.

DETAILED DESCRIPTION OF ILLUSTRATIVE EMBODIMENTS

Figure 1:
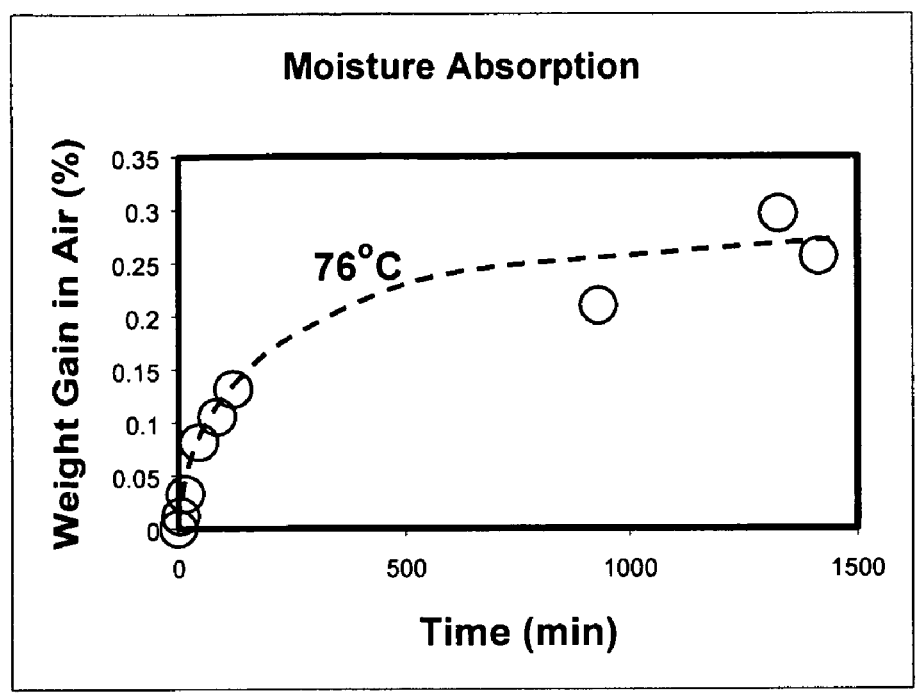
FIG. 1 shows the accumulated air moisture absorption of a 1-methylimidazolium modified polyepichlorohydrin as a function of time at 76° C.

The present invention relates to onium-modified polymers, such as onium-modified polyethers and 1-alkylimidazolium-modified polymers. Advantageously, the polymers provided by the present invention have achieved desirable properties such as strong moisture absorbing capability, minimum VOCs emission, and enhanced electrical conductivity.

Onium compounds include (a) cations (with their counterions) derived by addition of a hydron to a mononuclear parent hydride of the nitrogen, chalcogen and halogen families; (2) derivatives formed by substitution of the above parent ions by univalent groups; and (3) derivatives formed by substitution of the above parent ions by groups having two or three free valencies on the same atom.

There is no specific limitation to the backbone structures of the onium-modified polymers of the present invention. They can have a polyvinyl backbone, such as polyethylene, polystyrene, neoprene rubber, SBR, poly(methyl methacrylate), ABS, SAN, or EVA etc. They also can possess a backbone with one or more functional groups, such as polyether, polysulfide, polysulfone, poly(alkylene polysulfide), polyester, polycarbonate, polyphosphate ester, polyamide, polyurea, polyurethane, heterocyclic polymer, polyhydrazides, polyimide, and polyanhydride etc. Moreover, the polymer of the present invention can be onium-modified inorganic or inorganic/organic polymer such as polysiloxane, polysilane, carborane polymer, and organometallic polymer etc. The architecture of the onium-modified polymer can be as regular as linear, branched, or network, or as unusual as that of comb polymer, star polymer, ladder polymer, or dendrimer and so on. The onium-modified polymer can be a monomer, or a copolymer such as block copolymer, graft copolymer, statistical copolymer, random copolymer, periodic copolymer, or alternating copolymer etc. Likewise, terpolymers, tetrapolymers and so on, are also within the scope of the polymers of the present invention. Generally, however, the molecular weight of the polymer can be between 1,000 and 10,000,000, preferably between 10,000 and 5,000,000, more preferably between 100,000 and 1,000,000.

At least one pendant onium cation is linked to the polymer at a terminal or non-terminal position of its backbone. "Linked" generally means A and B can be directly bonded like A-B, or bridged by methylene, ethylene etc., like A-CH$_2$—B, or A-CH$_2$—CH$_2$—B etc. For example, the onium-modified polymer of the present invention can have a polyether backbone structure same as that of poly(oxyethylene), polyformadehyde, poly(phenylene oxide), or polyacetaldehyde. For more illustrative purpose, an onium-modified polyether according to the present invention can have one of the formulas as showed below, in which n, x, y, and z are integral numbers.

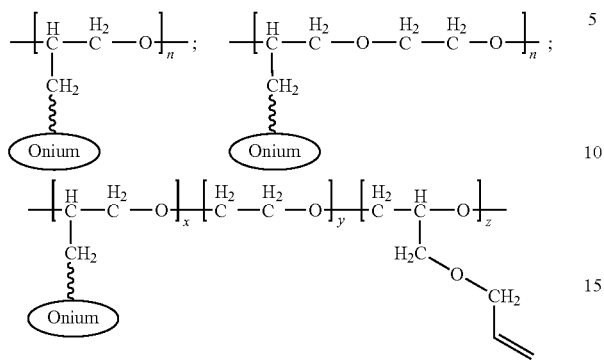

Exemplary onium groups include, but are not limited to, imidazolium, 1-alkylimidazolium, benzimidazolium, imidazolinium, pyridinium, piperidinium, pyrazinium, piperazinium, pyrrolium, pyrrolidinium, pyrazolium, diazolium, triazolium, pyridazinium, tetrazolium, amidinium, guanidinium, oxazolium, oxadiazolium, oxatriazolium, thiazolium, thiadiazolium, thiatriazolium, quaternary pyrazolidine, quaternary pyrrolidones, indolium, isoindolium, quinolinium, isoquinolinium, quinazolinium, quinoxalinium, ammonium, sulfonium, phosphonium, oxonium, iodonium, carbonium, derivates thereof, and mixture thereof. The onium has at least 1 positive charge and the charge can be either localized or delocalized in the molecule structure, depending upon specific onium species. The counter ion used to neutralize the onium cation of the ionic polymer of the present invention can be $Cl^-$, $Br^-$, $BF4^-$, $PF6^-$, $CO_3^{2-}$, $SO_4^{2-}$, $HSO^{4-}$, $HPO_4^{2-}$ and others known to the skilled artisan. In one specific embodiment, the onium is the imidazolium derivatives 1-($C_1$-$C_6$)alkylimidazolium in which the $C_1$-$C_6$ reference means alkyls groups having 1 to 6 carbon atoms, and the alkyl can be linear or branched, most preferably 1-methylimidazolium having the formula as specified below.

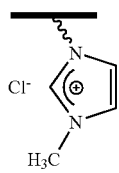

In accordance with the present invention, the polymer backbone and the onium cation are optionally connected via a linker group. One end of the linker group can connect to any suitable position in the polymer backbone, while the other end can connect to any suitable position in the onium moiety. Exemplary linker group includes, but not limited to, linear or branched ($C_1$-$C_6$)alkylene such as methylene, ethylene, and propylene, and linear or branched ($C_1$-$C_6$)oxyalkylene etc. The stereochemistry, due to the pendant onium group(s), of the ionic polymer according to the present invention can be isotactic, syndiotactic, or atactic. However, it should be understood that sometimes the entire or partial linker group can be named as part of the onium, and sometimes part of the onium group can be named as linker group or part of linker group. Both of the above described cases should be understood to be within the scope of the present invention. For example, the pendant onium of the following structure can be described as 1-methylimidazolium with a methylene linker, or a 1,3-dimethylimidazolium without any linker group.

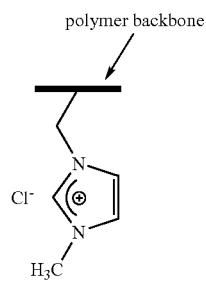

The polymer of the present invention can be prepared from any appropriate monomers comprising onium or onium precursors by a conventional polymerization reaction that is suitable for the target polymer to be synthesized, for example, step-reaction polymerization or polycondensation, cationic polymerization, anionic polymerization, complex coordinative polymerization, or free radical chain polymerization. Taking polyethers as a specific example, they can be produced from monomers such as ethylene oxide through ring-opening polymerization in the presence of acid or base catalyst, or from carbonyl compounds such as appropriate aldehydes and ketones through chain polymerization.

Alternatively, the onium-modified polymer of the present invention can be prepared from an intermediate polymer by modifying the intermediate polymer with suitable chemical reagents which introduces an onium into the structure of the polymer. For example, introduction of chloro-groups into suitable polymers can be achieved by any appropriate chlorination reactions. Further, the chloro-groups can be directly or indirectly converted to onium groups. Otherwise, an already halogen-containing polymer can be used to react with suitable onium precursor reagents under appropriate condition to produce the ionic polymer of the present invention. Exemplary halogen-containing polymers include, but not limited to, brominated butyl rubber, chlorinated butyl rubber, brominated substance of isobutylene-paramethylstyrene copolymer, chloroprene rubber, and hydrin rubber etc. Exemplary onium precursor reagents include, but not limited to, 1-methylimidazole, 1-benzolimodazole, and mixture thereof.

In one exemplary embodiment, a polyether product with pedant 1-methylimidazolium cations is produced by condensing a halogen-containing polymer such as polyepichlorohydrin with 1-methylimidazole at elevated temperature, preferably up to 50° C., more preferably up to 70° C., and most preferably up to 80° C. 1-methylimidazole is one example of room temperature ionic liquids which are considered as a green solvent for chemical synthesis. It should be understood that, due to the accessibility of the polyepichlorohydrin chloro group to the 1-methylimidazole, not necessarily all of the chloro groups are converted to 1-methylimidazolium. Preferably, the conversion is at least 30%, more preferably at least 50%, and most preferably at least 80%. Without being bound to any theory, the reaction is believed to occur in a mechanism as illustrated below.

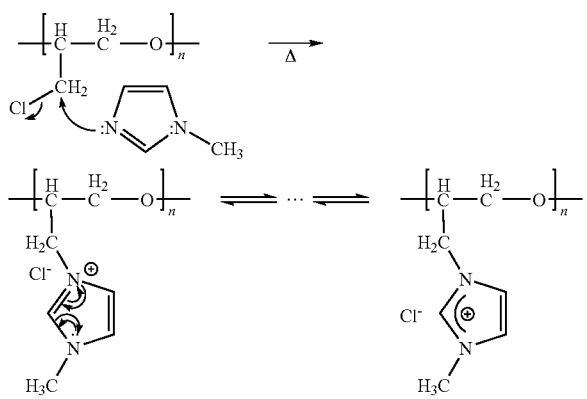

It may be desirable to include other additives known in the art into the present polymer formulation. Suitable additives include stabilizers, antioxidants, conventional fillers, processing aids, accelerators, extenders, curing agents, reinforcing agents, reinforcing resins, pigments, fragrances, and the like. Specific examples of useful antioxidants and stabilizers include 2-(2'-hydroxy-5'-methylphenyl)benzotriazole, nickel di-butyl-di-thiocarbamate, tris(nonylphenyl)phosphite, 2,6-di-t-butyl-4-methylphenol, and the like. Exemplary conventional fillers and pigments include silica, carbon black, titanium dioxide, iron oxide, and the like. Suitable reinforcing materials are inorganic or organic products of high molecular weight. Examples include glass fibers, asbestos, boron fibers, carbon and graphite fibers, whiskers, quartz and silica fibers, ceramic fibers, metal fibers, natural organic fibers, and synthetic organic fibers.

The onium-modified polymers are relatively environmentally friendly, and also have many other useful properties for industrial applications. The onium ionic groups, optionally together with the parent polymer, can have some effects on the structure and/or properties of the modified polymers, for example, ionic microdomain formation within the polymer matrix, solubility, dielectric constant, hydrophobic/hydrophilic balance, conductivity, and/or thermoplastic elastomeric properties etc. These properties or combination of these properties can make the polymer suitable for applications in plastic, fiber, rubber, adhesives, coating, and electrical industries. For example, the conductivity properties can make the polymer suitable for use in fuel cells, smart windows, non-linear optical materials, light-emitting diodes, conducting coatings, sensors, electronic display, and electromagnetic shielding etc. Because of its affinity to water, the polymer may also be useful for tire rubber compounds in improving snow/wet tractions. The polymer can also be used as a coating in packaging materials for reducing moisture. (The electrical current resistance of the polymer has reached $\leq 10^4$ ohms.)

EXAMPLES

Example 1

A nitrogen purged Brabender mixer (~60 g capacity) equipped with roller blades was initially set to 60 rpm and 75° C. The mixer was then charged with 35 g of Hydrin H (ZEON Chemicals). After 1 minute, 26.6 g of 1-methylimidazole (from Aldrich) was slowly added into the mixer, at about 5 g/min. Then, the agitation speed was adjusted to 20 rpm and the heating element was set to be isothermal condition. After 22 hours, the material in the mixer became very viscous and the temperature was adjusted to 100° C. After 1 hour, the heating element was turned off and the polymer was allowed to cool down. The polymer was removed from the mixer at 23° C.

Example 2

A nitrogen purged Brabender mixer (~60 g capacity) equipped with roller blades was initially set to 60 rpm and 75° C. The mixer was then charged with 35 g of Hydrin H (ZEON Chemicals). After 1 minute, 26.6 g of 1-methylimidazole (from Aldrich) was slowly added into the mixer, at about 5 g/min. Then, the agitation speed was adjusted to 20 rpm and the heating element was set to be isothermal condition. After 21 hours, the polymer was removed from the mixer.

Example 3

The procedure of Example 1 was repeated. The total reaction time was 24 hours.

Example 4

A small piece (about 5×5×3 mm) of sample 1 was placed into aluminum pan and weighed frequently over 48 hours. The material absorbed the moisture from air. The final material behaved like an elastomeric gel. The capacity to remove moisture was 0.3 g per gram of the polymer (see FIG. 1).

Example 5

Figure 2:
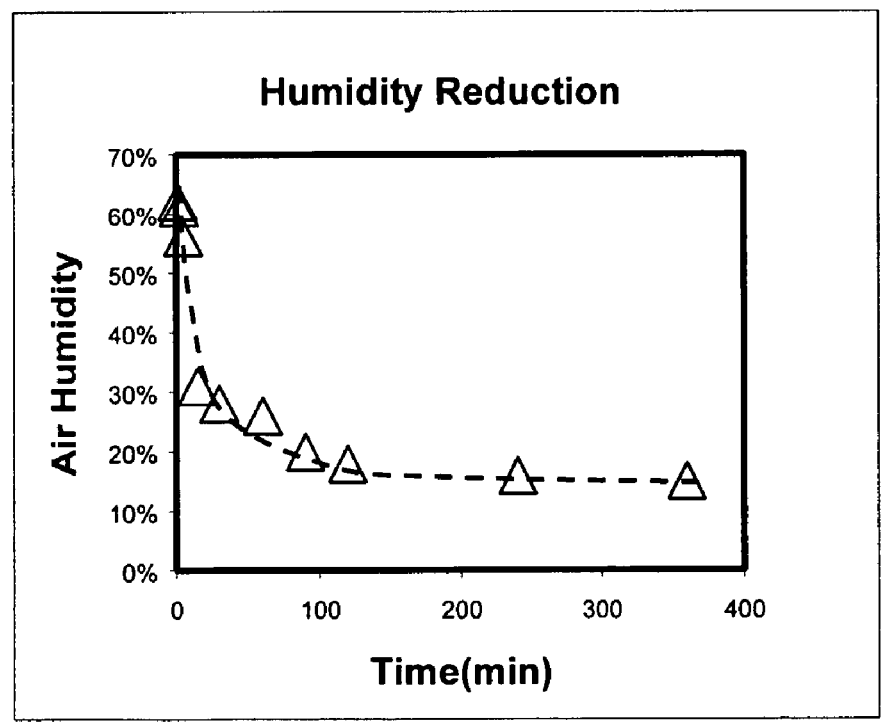
FIG. 2 shows the air humidity reduction by a 1-methylimidazolium modified polyepichlorohydrin as a function of time.

40 grams of the product from example 2 was placed into a sealed container (~4000 ml). The humidity inside the container was monitored. The humidity in the container at beginning was 62% and the temperature was 76° C. After one-day equilibrium, the humidity in the container was 15% and the temperature was 76° C. (see FIG. 2). In comparison, such a low humidity could be achieved only by using concentrated $H_2SO_4$ or $H_3PO_4$ solutions.

Accordingly, the new polymer can be used as coatings in packaging materials for reducing moisture. Because of strong affinity to water, it is also useful as an additive to tire rubber compounds for improving wetting capabilities, which will have effects on snow/wet traction and etc.

Example 6

The current resistance of the material from sample 3 and 4 was measured by an ohms meter, and showed $2\sim7\times10^4$ ohms.

Example 7

5 gram of the product from example 1 was mixed with 2 gram of propylene carbonate. The result material was a gel-like elastomer. The current resistance of the material was measured by an ohms meter, and showed $0.8\sim4\times10^3$ ohms.

Accordingly, we have developed a new polymer and compounds that could provide very good conductivity. The electrical current resistance of those materials had reached $\leq 10^4$ ohms, which could be very useful for battery membranes and separators.

The invention has been described with reference to the exemplary embodiments. Modifications and alterations may appear to those skilled in the art upon reading and understanding the specification. The invention is intended to include such modifications and alterations insofar as they come within the scope of the claims.

The invention claimed is:

1. A compound comprising a polymer having a backbone with one or more pendant imidazolium derivatives, wherein the backbone of the polymer comprises polyether having oxygen in the backbone.

2. The compound of claim 1, wherein the backbone of the polymer comprises poly(oxyethylene), polyformadehyde, poly(phenylene oxide), polyepichlorohydrin, or polyacetaldehyde.

3. The compound of claim 1, wherein a structure of the backbone of the polymer comprises one of the structures shown below, wherein n, x, y, and z are integral numbers and onium represent an imidazolium derivative:

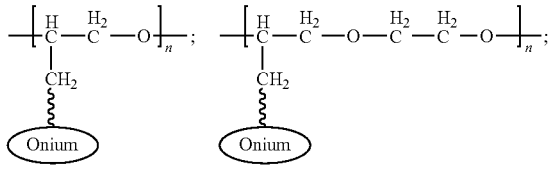

-continued

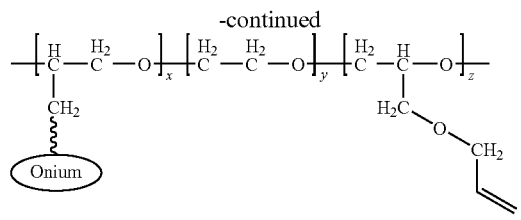

4. The compound of claim 1, wherein the pendant imidazolium derivative comprises 1-($C_1$-$C_6$)alkyl-3-($C_1$-$C_6$)alkylimidazolium.

5. The compound of claim 1, wherein the pendant imidazolium derivative comprises 1-methylimidazolium or 1,3-dimethylimidazolium.

6. The compound of claim 1, wherein the pendant imidazolium derivative is linked to the polymer backbone via an ($C_1$-$C_6$)alkylene group.

7. The compound of claim 1, wherein the pendant imidazolium derivative is linked to the polymer backbone via a methylene group.

8. The compound of claim 1, further comprising an anionic counter ion selected from the group consisting of $Cl^-$, $Br^-$, $BF_4^-$, $SbF_6^-$, $PF_6^-$, $CO_3^{2-}$, $SO_4^{2-}$, $HSO_4^-$, $FSO_3^-$, $HPO_4^{2-}$, and $CF_3SO_3^-$ for one or more pendant imidazolium derivatives.

9. The compound of claim 1, further comprises $Cl^-$ as the counter ion for one or more pendant imidazolium derivatives.

* * * * *